INVENTORS
Osamu (NMI) Honda
Hiroshi (NMI) Honda
BY
Attorneys

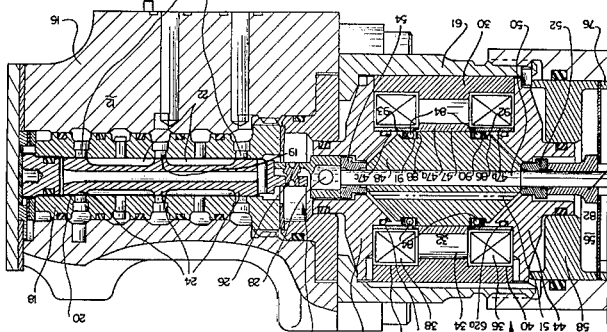

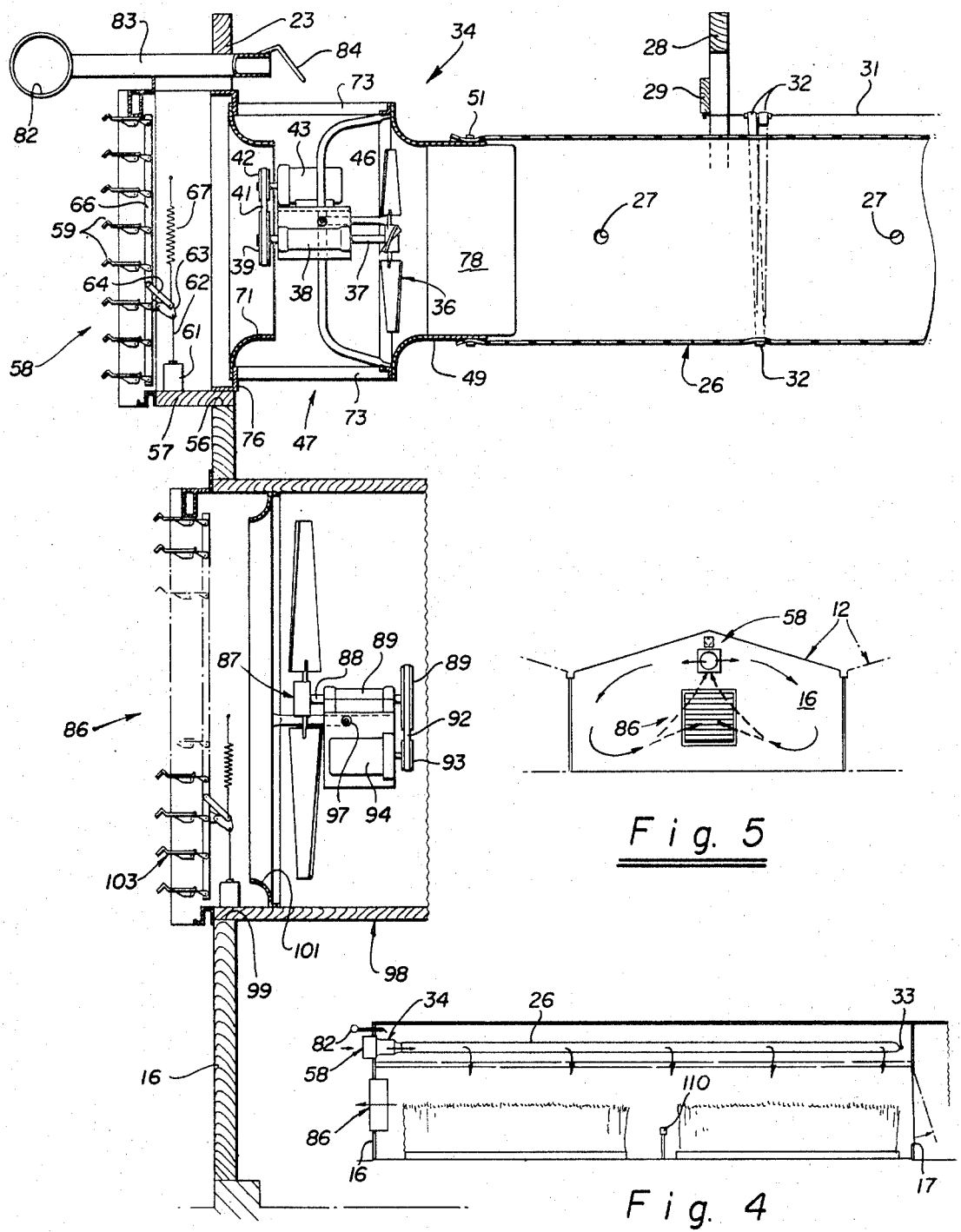

SYSTEM AND METHOD FOR CLIMATE CONTROL IN GREENHOUSES

This invention relates to a system and method for climate control in greenhouses.

Heretofore in greenhouse ventilation, a fresh air convection tube ventilation system has been provided in which an exhaust fan or fans are provided in the greenhouse to create a vacuum and the convection tube is used to bring in the fresh air from the outside and to distribute it within the greenhouse. Such a system, however, has been found to have a number of objections; for example, it oftentimes has been difficult to recirculate the air within the greenhouse. In addition, such systems have been relatively inefficient. There is, therefore, a need for a new and improved climate control system and method for greenhouses.

In general, it is an object of the present invention to provide a system and method for climate control in greenhouses which overcomes the above named disadvantages and objections.

Another object of the invention is to provide a system and method of the above character which continuously recirculates the air within the greenhouse.

Another object of the invention is to provide a system and method of the above character in which added cooling and $CO_2$ circulation can be obtained.

Another object of the invention is to provide a system and method of the above character in which the greenhouse temperature is controlled by bringing in cold air from the outside and mixing it with the warm air within the greenhouse.

Another object of the invention is to provide a system and method of the above character in which the air is uniformly distributed throughout the greenhouse.

Another object of the invention is to provide a system and method of the above character in which it is possible to obtain excellent temperature and humidity control in the greenhouse to stimulate plant growth.

Another object of the invention is to provide a system of the above character which is completely automatic.

Another object of the invention is to provide a system of the above character which can be readily installed in the greenhouse and which makes maximum use of existing equipment in the greenhouse.

Another object of the invention is to provide a system and method of the above character in which the outside drier air is utilized to reduce the humidity within the greenhouse and to, therefore, aid in keeping the growing plants dry and free of disease.

Another object of the invention is to provide a system and method of the above character in which a power assist is provided to help in circulating the air within the greenhouse.

Another object of the invention is to provide a system and method of the above character which has substantially increased efficiency and is capable of moving a much larger volume of air.

Additional objects and features of the invention will appear in the following description in which the preferred embodiment is set forth in conjunction with the accompanying drawings.

Referring to the drawings:

FIG. 2 is a cross-sectional view of one of the ridges of the greenhouse shown in FIG. 1.

FIG. 4 is a cross-sectional view in side elevation of one of the ridges of the greenhouse shown in FIG. 1 showing the movement of air within the greenhouse.

FIG. 5 is another cross-sectional view in front elevation of one of the ridges shown in FIG. 1 showing the air circulation within the greenhouse.

Figure 1:
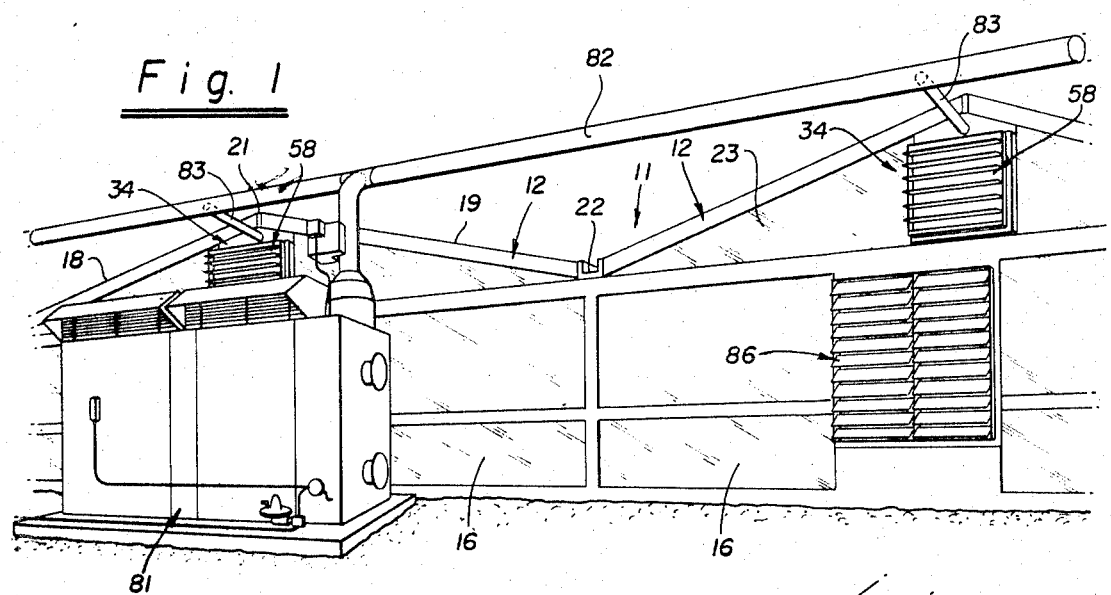
FIG. 1 is a partial elevational view of a multi-ridge or multi-section greenhouse with a climate control system and method incorporating the present invention.

In general, the system for controlling the climate in greenhouses consists of an elongate transparent tube which has spaced openings therein extending the length thereof. Means is provided for supporting the tube adjacent the ridge of the greenhouse. An opening is provided in the gable at one end of the greenhouse and a shutter is mounted in the opening. A motorized fan is mounted within the greenhouse adjacent to but spaced from the opening and the shutter in the opening. The inlet of the fan is positioned so that it is adapted to draw air from all around the fan from the greenhouse and also to draw air through the opening when the shutter is open and to force a stream of air into the elongate tube. Means is provided for securing one end of the tube to the fan to assist or power air through the tube and to thereby distribute the air uniformly throughout the greenhouse. Automatic control means is provided so that the temperature and humidity and the $CO_2$ content within the greenhouse can be relatively precisely controlled.

More in particular as shown in the drawings, a greenhouse 11 is provided which consists of a plurality of sections 12. The greenhouse 11 is provided with side walls (not shown). Each of the sections is provided with front and rear walls 16 and 17. Each section is also provided with inclined roof sections 18 and 19, the upper extremities of which form a ridge 21 and the lower extremities of which communicate with gutters 22. The front wall 16 includes a gable 23.

Each of the sections of the greenhouse 11 can be of any suitable size, as for example, 20 ft. wide by 100 ft. long. In elevation, the greenhouse can also be of any suitable dimension, as for example, 6 ft. from the ground to the gutter 22, and 42 inches from the gutter 22 to the ridge 21. The greenhouse 11 can be constructed of any suitable material. However, for reasons well apparent, a substantial portion of the greenhouse should be constructed of a relatively transparent material such as glass or plastic.

A system for controlling the climate of the greenhouse 11 is shown in the drawings and is provided on each section of the greenhouse. This climate control system consists of a transparent convection tube 26 formed of a suitable material such as a substantially transparent plastic. The convection tube can be made of any suitable size, as for example, 30 inches in diameter and is provided with a plurality of spaced holes 27 extending longitudinally of the convection tube on opposite sides thereof. The holes 27 can be of any suitable size, as for example, 2½ inches in diameter, and can be spaced in any desired manner. However, to obtain uniform distribution of the air within the greenhouse, the holes are located on the sides of the convection tube opposite each other and are spaced apart a suitable distance, as for example, 2 ft. along each side of the tube.

Figure 3:
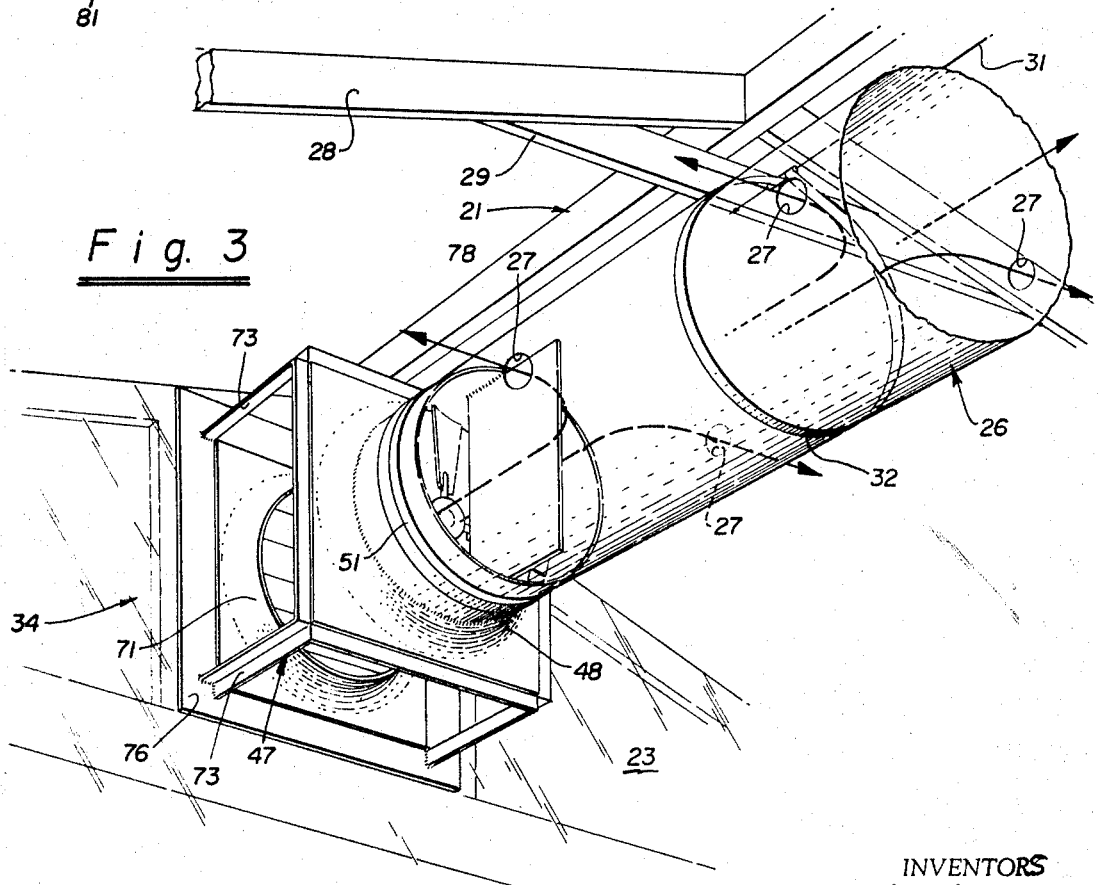
FIG. 3 is an isometric view of a portion of the system shown in FIG. 2.
Figure 6:
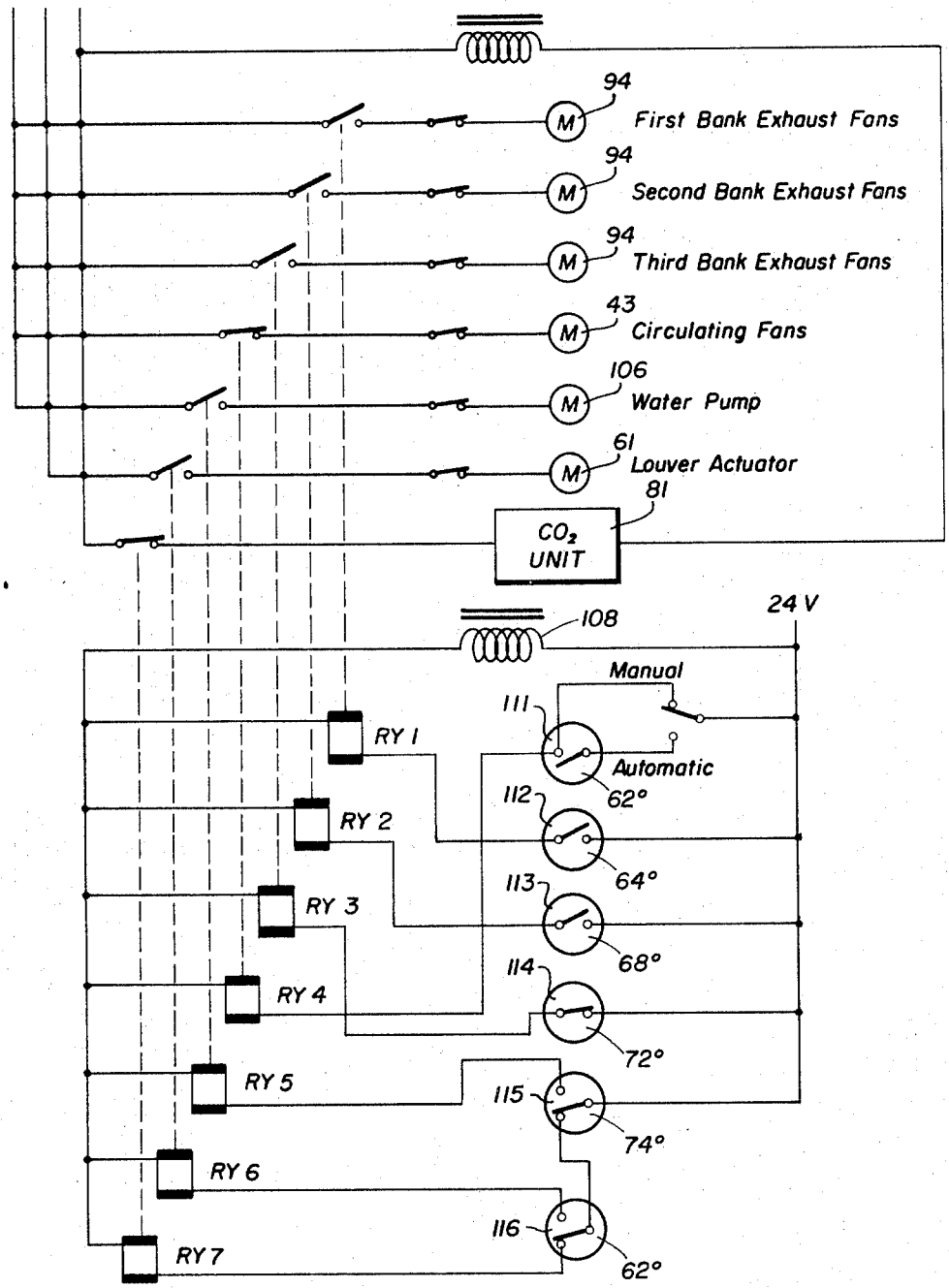
FIG. 6 is a circuit diagram of the control system utilized.

The convection tube 26 can be supported in any suitable manner within each section of the greenhouse but preferably is supported in a position which is central of the sides of the greenhouse and adjacent the top of the greenhouse. Thus, as shown in FIGS. 2 and 3, the convection tube is suppported upon rafters 28 which form part of the roof sections 18 and 19 by means of cross members 29 which have a taut wire 31 secured thereto by suitable means such as staples (not shown). Bands 32 of a suitable material such as a flexible pressure-sensitive tape encircle the tube 26 at spaced points extending longitudinally of the tube and are wrapped about the supporting wire 31 so that the convection tube 26 is supported by the wire 31 in relatively close proximity thereto. Thus, as shown, the convection tube is close to the ridge 21 and extends from one end of each greenhouse section to the other. One end of the convection tube 26 is closed by a clamp 33.

Means is provided for continuously supplying a stream of air to the other open end of the convection tube 26 in the form of a fan assembly 34 that consists of a multi-bladed fan 36 which has a shaft 37 rotatably mounted in a bearing housing 38 and driven by pulley 39. Pulley 39 is driven by a belt 41 which is driven by a pulley 42 that is driven by an electric motor 43. The bearing housing 38 and the motor 43 are carried by bracket 46 supported within the frame 47. The fan assembly 34 also consists of a venturi-like outlet 48. The outlet 48 is provided with a substantially cylindrical extension 49 upon which the open end of the convection tube 26 is mounted. The open end of the convection tube is secured to the extension 49 by suitable means such as pressure sensitive tape 51.

The gable 23 is provided with an opening 56 which is in alignment with the convection tube 26. A box-like frame 57 is mounted within the opening and carries a louver or shutter assembly 58 of a conventional type which includes a plurality of louvers or shutters 59 which are movable between open and closed positions. Means is provided for moving the shutters between the open and closed positions by automatically operated means as hereinafter described which includes a solenoid 61 that is connected by a rod 62 to a pivotally mounted plate 63 which is connected to an arm 64. The arm 64 is pivotally connected to a rod 66 which is pivotally connected to each of the louvers 59 so that as the rod is pulled downwardly, the louvers 59 are moved to an open position. Means is provided for automatically returning the louvers to a closed position when the solenoid 61 is deenergized and consists of a spring 67 which has one end connected to the plate 63 and the other end connected to the frame 57. A venturi-like inlet 71 is mounted in the frame 57 and extends inwardly into the greenhouse in alignment with the fan 36 and the tube 26.

Means is provided for mounting the fan assembly 34 in a position so that it is in general alignment with the inlet 71 and also so that it is spaced from the inlet 71 so that it can draw air all around the fan from the interior of the greenhouse. This means consists of a plurality of struts or supports 73 mounted on the four corners of the frame 47 and secured to a rectangular structure 76 mounted in the framework 57. As can be seen from FIG. 3, the inlet of the fan 36 is open so that it can draw air in from the interior of the greenhouse and can also draw in air from the outside of the greenhouse when the shutter or louver assembly 58 is open.

Means is provided for straightening the stream of air which is delivered from the fan 36 into the convection tube 26 and consists of a plate 78 that is mounted in the forward extremity of the extension 49 and extends diametrically thereof to straighten out the air and cause the air to pass relatively smoothly down the convection tube 26.

Means is provided for delivering controlled amounts of $CO_2$ to the convection tube 26 and consists of a suitable $CO_2$ generator 81 (see FIG. 1) such as manufactured by the Tectrol Division of the Whirlpool Corporation of St. Joseph, Michigan. The $CO_2$ generated by the $CO_2$ generator 81 is supplied through a distribution pipe 82 to all sections of the greenhouse 11 through feeder pipes 83 extending through the gable 23 of each section and terminating in the vicinity of the upper struts 73. A deflector 84 is mounted on the outer extremity of the duct 83. This deflector, together with the fact that the $CO_2$ is heavier than air, causes the $CO_2$ to flow downwardly toward the inlet side of the fan 36 so that it is well mixed and delivered along with the air stream into the convection tube 26.

An exhaust fan assembly 86 is mounted in each section of the greenhouse and, as shown in FIG. 2, can be mounted in the front wall 16 of each section of the greenhouse. The exhaust fan assembly consists of a multi-bladed exhaust fan 87 which has a shaft 88 rotatably mounted in the bearing housing 89 and driven by a pulley 91. The pulley 91 is driven by a belt 92 which is driven by a pulley 93 driven by a motor 94. The bearing assembly 89 and the motor 94 are supported by a bracket 97 mounted within a framework 98. The framework 98 is mounted in an opening 99 provided in the front wall 16. A venturi-like shroud 101 is mounted within the framework 98 forward of the fan 87. A louver or shutter assembly 103 similar to the louver or shutter assembly 58 is mounted within the framework 98 and is provided with means for automatically moving the shutter between open and closed positions. The means for opening and closing the shutters is not absolutely necessary because it has been found that the force of air from the exhaust fan 87 is normally sufficient to move the individual shutters or louvers from the vertical position to the horizontal position to permit the exhaust of air.

Thus far, it can be seen that only one section of the greenhouse 11 has been described. Normally, as pointed out above, it is common that a greenhouse consists of a plurality of sections and that each of the sections is provided with the equipment shown in FIGS. 2 and 3. In addition, the control system as shown in FIG. 5 includes a suitable source of power such as 240 volt/120 volt 3-phase 4-wire in which the three phases are designated as L1, L2 and L3. As shown, this power is supplied through contacts of relays RY1 - RY7 to motors 94 for the exhaust fans, to the motors 43 for the circulating fans, to a motor 106 for the pads which normally form a part of one wall of a greenhouse and through which air may be drawn for cooling purposes, and to the actuators 61 for the louvers. In addition, power is supplied to the $CO_2$ unit 81. The relays are supplied with power through a transformer 108, through thermostats 111 - 116, in which thermostats 112, 113 and 114 can be identified as cooling thermostats, and the remaining thermostats can be identified as cooling and heating thermostats. The thermostats can be set to operate at any desired temperature, as for example, thermostat 112 can be set to operate at 64°; 113 at 68°; 114 at 72°; 115 at 74°; 116 at 62°; and 111 to be manually operated. The thermostats are located in a console 110 in the greenhouse at approximately the same height as the plants in the greenhouse (see FIG. 4).

Operation of the system in performing the method for controlling the climate of a greenhouse may now be briefly described as follows. Let it be assumed that it is night time and that it is relatively cool, as for example, below 62°. When such is the case, the normally closed contacts for relays RY4 and RY7 cause the circulating fan motors 43 to continue operating and to cause the $CO_2$ unit 81 to be generating $CO_2$. Thus, during this time, the fan 36 is operating continuously and is recirculating the air within the greenhouse by drawing the air from the greenhouse into the inlet of the fan and discharging the same as an air stream through the convection tube where it is distributed uniformly and evenly throughout the greenhouse to provide uniform temperature throughout the greenhouse and to also provide a uniform distribution of the $CO_2$ which is being introduced by the $CO_2$ generator throughout the greenhouse. This distribution of the air is shown in FIGS. 4 and 5. Thus, even during the night, there are no cold spots within the greenhouse. At the same time, the humidity within the greenhouse is kept uniform and the plants are kept dry.

Now let it be assumed that the sun rises and the outside temperature increases to a suitable temperature, as for example, 62°. When this occurs, the thermostat 116 is operated to energize the relay RY6 and to deenergize relay RY7. Energization of relay RY6 closes its contacts 1 and 2 to operate the actuators 61 and to move the louvers 59 of the louver assembly 58 to an open position to permit the cooler outside air to enter the greenhouse by it being drawn into the convection tube 26 by the fan 36 and mixing the cold outside air with the warm inside air of the greenhouse and delivering it through the convection tube and distributing it uniformly throughout the greenhouse. At the same time this is occurring, the operation of relay RY7 opens its contacts 1 and 2 to cause the $CO_2$ unit to stop operating. It is not necessary to supply $CO_2$ to the plants at this time because there is sufficient $CO_2$ in the outside fresh air which is being brought into the greenhouse as soon as the shutter assembly 58 is opened.

Now let it be assumed that as the sun is rising, the temperature within the greenhouse still continues to increase and has increased to 64°. When this occurs, thermostat 112 operates to energize relay RY1. This closes its contacts to energize the motors 94 of the first bank of exhaust fans of the greenhouse. As soon as this occurs, there is increased air circulation within the greenhouse because additional air is withdrawn from the greenhouse and discharged into the outside air. As pointed out previously, it is not necessary to provide additional means for opening and closing the shutter assembly 103 because it closes by gravity and is opened by the force of the air as soon as the exhaust fan 87 is placed in operation.

If the temperature within the greenhouse still continues to rise, first the thermostat 113 is operated to place in operation the next set of exhaust fans, and upon continuing to rise, the thermostat 114 is operated to place the third set of exhaust fans into operation. If the temperature rises still further, the thermostat 115 is operated to energize relay RY5 which closes its contacts to energize the motor 106 for the water pump to place the pads in operation. When the thermostat 115 switches from heating to cooling, relay RY6 is deenergized opening its contacts to cause the louver assembly 58 to be moved to a closed position so that all the air entering the greenhouse must pass through the pads to provide the maximum cooling for the greenhouse.

As the temperature in the greenhouse decreases, the procedure heretofore outlined is reversed. Thus, as night-fall approaches, first the water pump is turned off and the louver assembly 58 is opened. Thereafter, the third, second and first sets of the exhaust fans are progressively turned off. Eventually, the shutter assembly 58 is moved to a closed position and the fan 36 recirculates only the interior air of the greenhouse while at the same time distributing $CO_2$ from the $CO_2$ generator throughout the greenhouse.

From the foregoing, it can be seen that an automatic system has been provided which gives excellent climate control in the greenhouse. The air within the greenhouse is moved continuously to maintain uniform temperature and humidity within the greenhouse while at the same time uniformly distributing $CO_2$ through the greenhouse whenever it is required. The control system is completely automatic so that a minimum of labor is required.

We claim:

1. In a system for controlling the climate in a greenhouse having an opening therein, an elongate tube disposed within the greenhouse and having openings therein spaced longitudinally of the tube, means for supporting the tube within the greenhouse, one end of the tube being in general alignment with the opening in the greenhouse, a fan, means for mounting said fan in said greenhouse so that it is in proximity to said opening in said greenhouse but spaced from said opening, said fan being positioned so that its inlet is in general alignment with the opening in the greenhouse and so that its inlet is in communication with the interior of the greenhouse, means mounting one end of the elongate tube on the outlet of the fan so that the fan introduces a stream of air into the tube whereby the tube discharges the air substantially uniformly throughout the greenhouse, means for controlling the flow of air through the opening in the greenhouse and an exhaust fan mounted in said greenhouse for exhausting air from the greenhouse.

2. A system as in claim 1 wherein said means for controlling the flow of air through the opening in the greenhouse includes shutter means movable between open and closed positions, and means for operating said shutter means.

3. In a system for controlling the climate in a greenhouse of the type having walls forming the same with first and second openings in the walls, a shutter assembly mounted in said first opening to control the passage of air through said first opening, an elongate distribution tube mounted in said greenhouse substantially in axial alignment with said first opening, said tube being formed to include a plurality of longitudinally spaced apart openings for distributing jets of air in said greenhouse, a first fan having inlet and outlet portions mounted in said greenhouse substantially in axial alignment with said first opening and said tube, said inlet portion facing said first opening and being spaced therefrom by a predetermined space, said outlet portion of the fan being disposed for directing air into said distribution tube, an exhaust fan mounted in said second opening, and control means interconnecting said exhaust fan and said shutter assembly in such manner that said exhaust fan operates when said shutter assembly is open to enhance the flow of outside air through said distribution tube, said control means including temperature responsive means for controlling the operation of said shutter assembly and said exhaust fan according to the temperature in said greenhouse.

4. A system as in claim 3 together with at least one additional exhaust fan mounted in an oening in a wall of said greenhouse and controlled by said control means.

5. A system as in claim 4 wherein said at least one additional exhaust fan is connected to said control means in such manner that the number of exhaust fans running is increased when the temperature in the greenhouse reaches a predetermined level.

6. In a ventilating and circulating air system for a room, a shutter assembly mounted in a wall of said room, a first fan located a predetermined space from said shutter assembly, said fan being exposed to the inside of said room through said space, a tube assembly connected to the discharge of said fan including a plurality of spaced apart openings for distributing jets of air within said room, and a second fan mounted in a wall of said room.

7. A ventilating and circulating air system as in claim 6 wherein said second fan is an exhaust fan.

8. A ventilating and circulating air system as in claim 6 together with means for selectively opening said shutter assembly and running said second fan during substantially continuous running of said first fan.

9. In a system for controlling the climate in a greenhouse having an opening therein, an elongate tube disposed within the greenhouse and having openings therein spaced longitudinally of the tube, means for supporting the tube within the greenhouse, one end of the tube being in general alignment with the opening in the greenhouse, a fan, means for mounting said fan in said greenhouse so that it is in proximity to said opening in said greenhouse but spaced from said opening, said fan being positioned so that its inlet is in general alignment with the opening in the greenhouse and so that its inlet is in communication with the interior of the greenhouse, means mounting one end of the elongate tube on the outlet of the fan so that the fan introduces a stream of air into the tube whereby the tube discharges the air substantially uniformly throughout the greenhouse, means for controlling the flow of air through the opening in the greenhouse, an exhaust fan mounted in said greenhouse for exhausting air from the greenhouse, and temperature control means for controlling the operation of said exhaust fan.

10. In a system for controlling the climate in a greenhouse having an opening therein, an elongate tube disposed within the greenhouse and having openings therein spaced longitudinally of the tube, means for supporting the tube within the greenhouse, one end of the tube being in general alignment with the opening in the greenhouse, a fan, means for mounting said fan in said greenhouse so that it is in proximity to said opening in said greenhouse but spaced from said opening, said fan being positioned so that its inlet is in general alignment with the opening in the greenhouse and so that its inlet is in communication with the interior of the greenhouse, means mounting one end of the elongate tube on the outlet of the fan so that the fan introduces a stream of air into the tube whereby the tube discharges the air substantially uniformly throughout the greenhouse, means for controlling the flow of air through the opening in the greenhouse, an exhaust fan mounted in said greenhouse for exhausting air from the greenhouse, said means for controlling the flow of air through the opening in the greenhouse including shutter means movable between open and closed positions, means for operating said shutter means, and temperature operated means for operating said shutter means.

11. In a ventilating and circulating air system for a room, a shutter assembly mounted within a wall of said room, a first fan located a predetermined space from said shutter assembly, said fan being exposed to the inside of said room through said space, a tube assembly connected to the discharge of said first fan including a plurality of continually spaced openings for distributing jets of air within said room, and a second fan mounted within a wall of said room, said second fan being an exhaust fan, said shutter assembly including motorizing means, said system further including means for actuating said motorizing means and said exhaust fan in response to temperature changes within said room.

12. In a ventilating and circulating air system for a room, a shutter assembly mounted within a wall of said room, a first fan located a predetermined space from said shutter assembly, said fan being exposed to the inside of said room through said space, a tube assembly connected to the discharge of said first fan including a plurality of continually spaced openings for distributing jets of air within said room, a second fan mounted within a wall of said room, and means for controlling the operation of said first fan according to the temperature within said room.

13. In a method for controlling the climate in a greenhouse by the use of a convection tube mounted within the greenhouse, said convection tube extending substantially the entire length of the greenhouse and including a plurality of spaced apart openings for distributing jets of air within the greenhouse, the steps of drawing outside air into the greenhouse through an opening in a wall thereof and forcing said outside air through said convection tube under a positive pressure, drawing air from inside the greenhouse into said convection tube and forcing said air from inside the greenhouse through said tube under a positive pressure, and discharging air from within said greenhouse through an exhaust fan mounted in a second opening in a wall of said greenhouse while said outside air is being drawn into said greenhouse.

14. In a method for controlling the climate in a greenhouse by the use of a convection tube mounted within the greenhouse, said convection tube extending substantially the entire length of the greenhouse and including a plurality of spaced apart openings for distributing jets of air within the greenhouse, the steps of drawing outside air into the greenhouse through an opening in a wall thereof and forcing said outside air through said convection tube under a positive pressure, drawing air from inside the greenhouse into said convection tube and forcing said air from inside the greenhouse through said tube under a positive pressure, discharging air from within said greenhouse through an exhaust fan mounted in a second opening in a wall of said greenhouse while said outside air is being drawn into said greenhouse, monitoring the temperature inside said greenhouse and controlling the operation of the exhaust fan in accordance with said temperature.

* * * * *